(12) United States Patent
Kowalchuk

(10) Patent No.: US 8,261,624 B2
(45) Date of Patent: Sep. 11, 2012

(54) EXTERNAL SENSOR ADJUSTMENT SYSTEM AND METHOD

(75) Inventor: Trevor Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 879 days.

(21) Appl. No.: 12/328,757

(22) Filed: Dec. 4, 2008

(65) Prior Publication Data

US 2010/0139422 A1    Jun. 10, 2010

(51) Int. Cl.
*B65D 90/48* (2006.01)
*B65D 90/22* (2006.01)
*B65D 90/00* (2006.01)

(52) U.S. Cl. ........................ 73/866.5; 220/694
(58) Field of Classification Search ............. 73/866.5; 220/694

See application file for complete search history.

(56) References Cited

U.S. PATENT DOCUMENTS

| 3,099,158 A | 7/1963 | Barker, Jr. |
| 3,384,195 A * | 5/1968 | Jepson et al. ............. 219/442 |
| 5,649,600 A * | 7/1997 | Marsh ................... 172/4.5 |
| 7,640,876 B2 * | 1/2010 | Memory .................. 111/170 |
| 7,969,319 B2 | 6/2011 | Kowalchuk |

FOREIGN PATENT DOCUMENTS

CA      2071424      12/1993

* cited by examiner

*Primary Examiner* — Thomas P Noland
(74) *Attorney, Agent, or Firm* — Rebecca Henkel

(57) ABSTRACT

In accordance with one embodiment, a system may include an external position adjuster configured to move a sensor within an agricultural tank without requiring access inside the agricultural tank. In another embodiment, a method may include magnetically coupling a sensor to a structure located inside an agricultural tank, wherein the sensor is adjustable to different positions inside of the agricultural tank in response to user input from outside of the agricultural tank.

17 Claims, 6 Drawing Sheets

EXTERNAL SENSOR ADJUSTMENT SYSTEM AND METHOD

BACKGROUND

The present invention relates generally to the field of agricultural implements, and more specifically to a sensor adjustment system for a product container or tank of an implement.

Agricultural implements may include a tank to enable a seeding or fertilizing operation. The tank may utilize a distribution mechanism and conduits to dispense the tank's contents, such as seeds or chemicals, as the implement is towed across a field. As the contents of the tank are dispensed, the operator may desire to have an indicator show when the contents reach a specified level in the tank. For instance, an operator may use a sensor to indicate when the chemicals in the tank are at a level of about 10% of capacity. When such a level is indicated, the operator may terminate the fertilizing or field treatment task and return to refill the tank with more chemical to finish the task. Depending on the contents of the tank, the operator may want to configure the sensor to show the contents level at various heights or positions in the tank. In certain applications, it may be undesirable to require an operator to enter the tank, e.g., to set the sensor.

BRIEF DESCRIPTION

In accordance with one embodiment, a system may include an external position adjuster configured to move a sensor within an agricultural tank without requiring access inside the agricultural tank. In another embodiment, a method may include magnetically coupling a sensor to a structure located inside an agricultural tank, wherein the sensor is adjustable to different positions inside of the agricultural tank in response to user input from outside of the agricultural tank.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, various configurations of agricultural tank level sensor position adjustment systems may be utilized to enhance operator control over a tank level sensor without requiring entry into a tank and without operator exposure to tank contents. For example, the embodiments discussed below may include a rigid rod that can be coupled to a tank level sensor to enable a simple and robust external adjustment for the sensor inside a tank. By utilizing a rigid rod coupled to the sensor body, the arrangement provides a rigid coupling to the sensor that enable remote/external positioning of the sensor without user exposure to tank contents and provides a simple system to adjust the sensor's position within the tank. As discussed further below, the embodiments improve the ease with which an operator may adjust the level indicated by the sensor by providing a mechanism to adjust the sensor position external to the tank. Moreover, the sensor may be magnetically coupled to a structure within the tank, thereby providing a coupling mechanism that is less subject to chemical degradation and is configurable to be positioned anywhere along it's magnetic mounting location.

Figure 1:
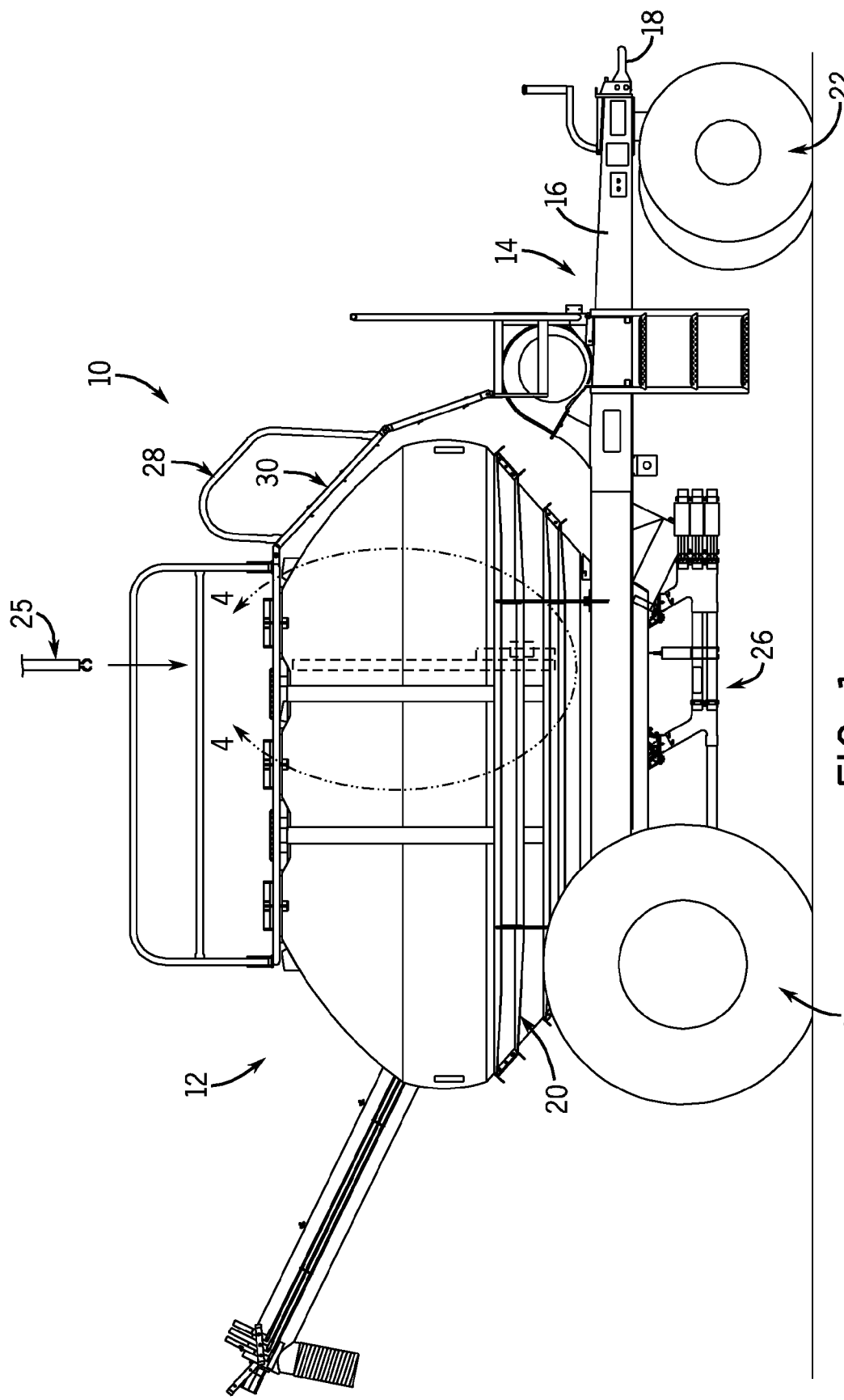
FIG. 1 is a side view of an embodiment of an agricultural implement including a tank and a sensor, in accordance with aspects of the invention.

FIG. 1 is an illustration of a side view of an embodiment of agricultural implement 10. Agricultural implement 10 is designed to distribute products, such as seed, fertilizer, and/or chemicals, from a tank 12 that is supported by implement frame 14. Implement frame 14 includes a tow bar 16 and a hitch 18 which may be used to couple the implement to a towing vehicle, such as a tractor. Tank 12 may be composed of any suitable corrosion resistant material, such as a stainless steel, galvanized steel, or a plastic which may be used to hold the product. The tank 12 includes walls 20 of an appropriate thickness to support the tank's contents. Tank 12, its contents, and frame 14 may be supported by front wheels 22 and rear wheels 24. As shown, the agricultural implement 10 may also include an external position adjuster 25 that may be used to position a tank level sensor within the tank 12. The external position adjuster 25 enables an operator to adjust the position of the tank level sensor from outside the tank 12, providing easy access to the sensor. As appreciated, products or contents of tank 12 are dispensed by a distribution system 26 located beneath the tank 12. An operator may access the upper portion of tank 12 via rails 28 and ladder or stairs 30 to access openings located on the top of tank 12. As shown, the top of tank 12 may be elevated ten or twelve feet above the ground, depending upon the implement and application, making access to a top and/or inside tank 12 difficult. Further, an agricultural implement 10 may include more than one tank 12 to distribute different kinds of products to a field. As depicted, an operator may access the height or level sensor within the tank without having to climb inside the tank 12, thereby enabling sensor adjustments without exposure to tank contents. For instance, tank 12 may be filled with hazardous pesticides that may be used to eliminate unwanted insects or plants from a crop or field. Thus, external position adjuster 25 allows an operator to adjust the sensor component completely outside of the tank 12.

Figure 2:
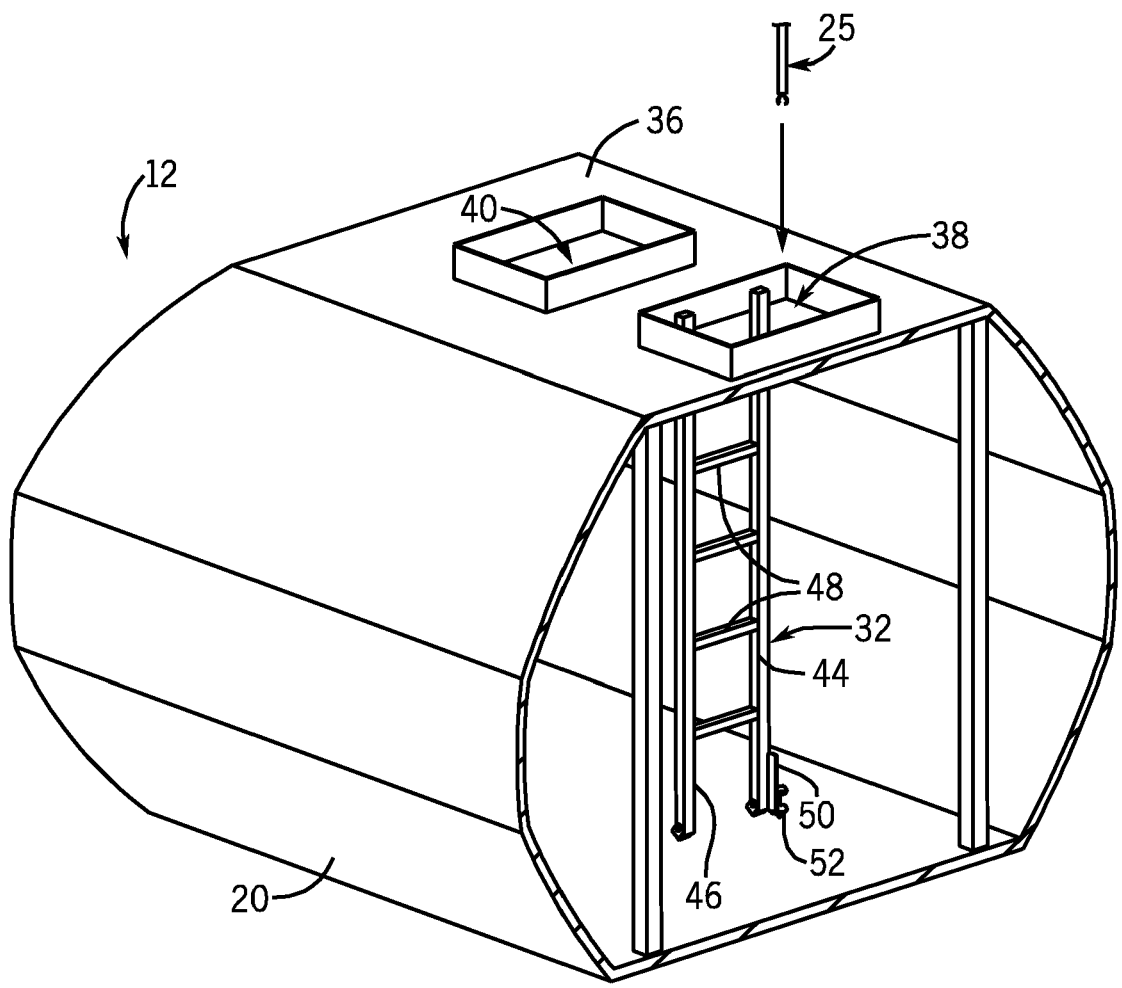
FIG. 2 is a cut away perspective view of an embodiment of the tank in FIG. 1, including the sensor and an external position adjuster.

FIG. 2 is a perspective cut-away illustration of an embodiment of tank 12. Tank walls 20 are of a sufficient thickness, such as about one half to two centimeters thick, thereby enabling tank 12 to hold a large amount of fertilizer or other product to be distributed onto a field. In some embodiments, the walls 20 may be as few as as 3 millimeters thick or as great as 3 centimeters thick. Tank 12 may include a ladder structure 32 leading to the upper surface 36 of the tank 12, which includes access holes 38 and 40. Ladder 32 includes right rail 44 and left rail 46, which are joined by horizontal steps 48, thereby enabling operator access to the floor of tank 12 from access 38. A metal mounting structure 50 may be coupled to right ladder member 44 to enable sensor 52 to mount to a location on the ladder 32 via a magnet. Ladder 32 and mounting structure 50 may be composed of any suitable material, such as stainless steel, galvanized steel, or another alloy. Moreover, the body of sensor 52 may include a powerful magnet that enables the sensor 52 to be securely coupled to the mounting structure 50. For example, a rare earth magnet may be embedded in the body of sensor 52 to enable a strong coupling of sensor 52 to mounting structure 50. Thus, in the example, mounting structure 50 may include sufficient material to attract and hold a magnet located within the body of sensor 52. In addition, mounting structure 50 may be of a suitable height to enable the operator to configure the position of sensor 52 according to the contents of the tank and other factors.

Sensor 52 may be any suitable sensor to determine a product level within tank 12. For instance, sensor 52 may include an optical or mechanical component to determine whether the contents of tank 12 are above or below the sensor level. In an example, sensor 52 may be magnetically coupled to mounting structure 50 at a position to indicate, via an indicator light, when greater than 10% of the tank 12 contents are present. The sensor 52 may then have an audible or visible alarm (e.g. a light) to indicate when less than 10% of the tank's contents are present. In other embodiments, mounting structure 50 may be as tall as half of the height of ladder 32, thereby enabling the sensor 52 to detect when tank 12 is less than half full or when the tank 12 is empty. Moreover, sensor 52 includes a coupling mechanism located on the sensor body that enables external position adjuster 25 to couple to the body of sensor 52, thereby enabling sensor 52 to be moved vertically along mounting structure 50. The coupling mechanism of external position adjuster 25 may be a hook and eyelet, a magnetic coupling, or a biased mechanical coupling. As depicted, sensor 52 includes a cylindrical member, located on top of the sensor 52 body, which may be attached to external position adjuster 25 as the position adjuster is lowered into tank 12, thereby enabling an operator to change the position and indication level given by height sensor 52. External position adjuster 25 include a biased coupling mechanism that couples to the cylindrical member of sensor 52. In other embodiments, tank 12 may include two sections, one for each type of product to be distributed, wherein each section has an access hole such as access hole 38, ladder structure 32 and sensor 52. In the example, a portion of the tank 12 may contain a pesticide while the other portion of the tank may include a fertilizer.

As appreciated, the adjustable positioning of sensor 52 within tank 12 enables the operator to configure the indication or alarm level for tank 12. For example, if an operator were applying a costly pesticide that is distributed onto a field with a relatively low density, then an operator may choose to receive an indication of the level of the tank 12 from the sensor 52 as the tank 12 level falls below 10% of capacity. This may be desirable to an operator due to the fact that a low density distribution of the pesticide means that the operator will slowly run out the product to distribute. In other embodiments, the operator may configure the sensor 52 via the external position adjuster 25 to indicate when less than 25% of the product is available. This may occur when the product is being densely distributed onto a field. Therefore, the external position adjuster 25 enables an operator to easily configure the level detected by sensor 52 within tank 12.

Figure 3:
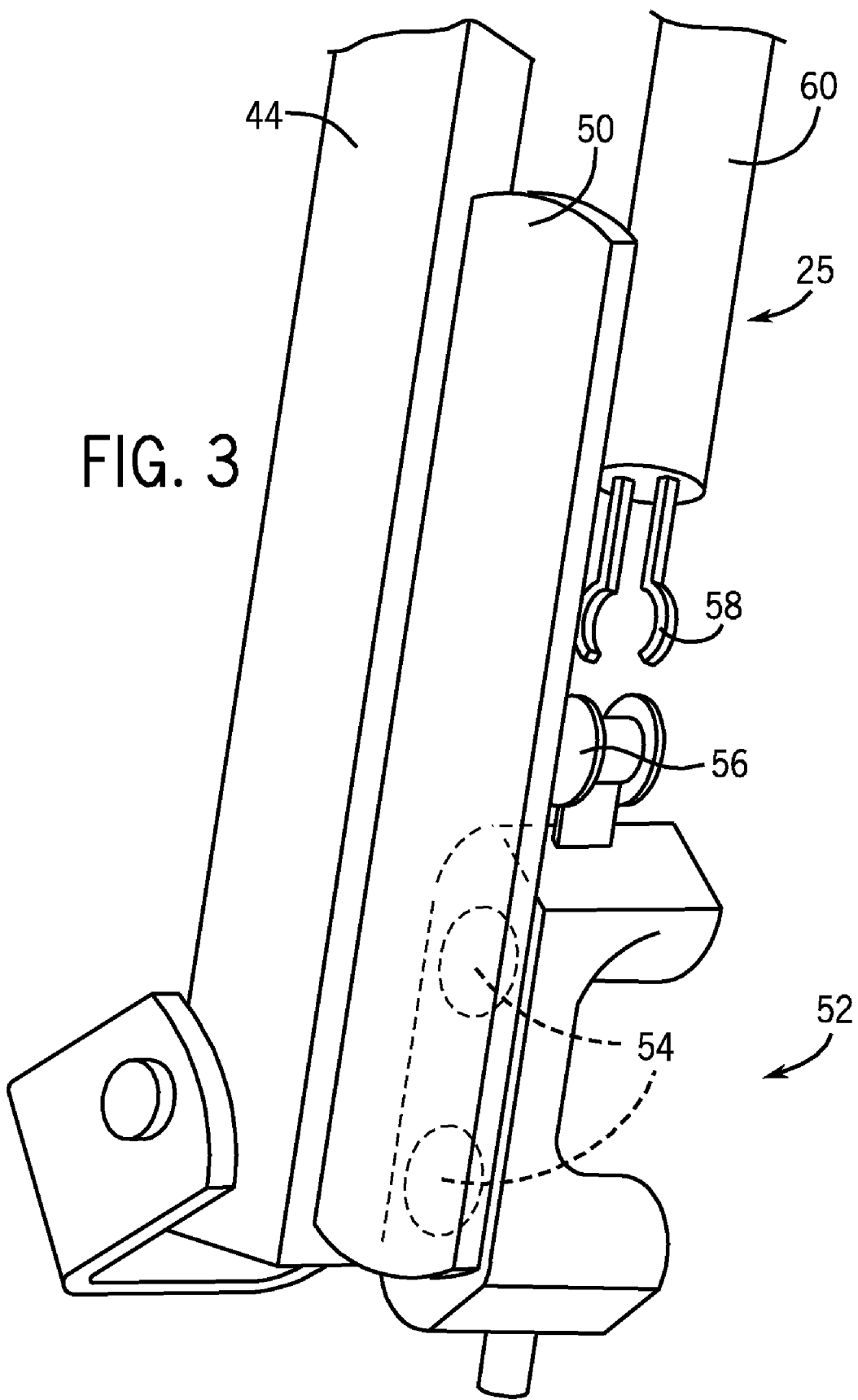
FIG. 3 is a detailed perspective view of an embodiment of the sensor and external position adjuster shown in FIG. 2.

FIG. 3 is a detailed perspective view of an embodiment of sensor 52, ladder member 44, mounting structure 50, and a portion of external position adjuster 25. As shown, the body of sensor 52 includes magnetic member 54, which couples sensor 52 to mounting structure 50. Sensor 52 also includes a cylindrical coupling structure 56 that mates with position adjuster coupling structure 58, thereby enabling the position adjuster 25 to move sensor 52 vertically along mounting structure 50. As depicted, position adjuster coupling structure 58 is located at the end of a rigid rod 60, which may be made of any suitable rigid material such as plastic, metal, or wood. In the embodiment, coupling structures 56 and 58 may be referred to as a mechanically biased coupling mechanism, wherein structure 58 is biased closed by a spring mechanism and is opened by an operator to enable coupling to member 56. As appreciated, any suitable type of coupling mechanism may be used, including magnetic, adhesive-based, and any suitable locking mechanical mechanism. Further, coupling structures 56 and 58 may of any suitable type that enables external position adjuster 25 and sensor 52 to be attached and de-attached from one another simply and quickly. For example, in another embodiment, the mechanism used to couple sensor 52 to external position adjuster 25 may be a hook and eyelet which the hook, located at the end of external position adjuster 25 may attach to a hole located on sensor 52, thereby coupling the two components together. In another example, external position adjuster 25 may include a magnet located at the end of rigid rod 60 to attach to the body of sensor 52, thereby enabling a magnetic connection between position adjuster 25 and a magnetic surface located on sensor 52. External position adjuster 25 enables an operator to flexibly configure the location of sensor 52 from outside tank 12, thereby enabling position adjustments without exposure to tank contents and providing a simple method to flexibly detect the height of the tank's contents.

Figure 4:
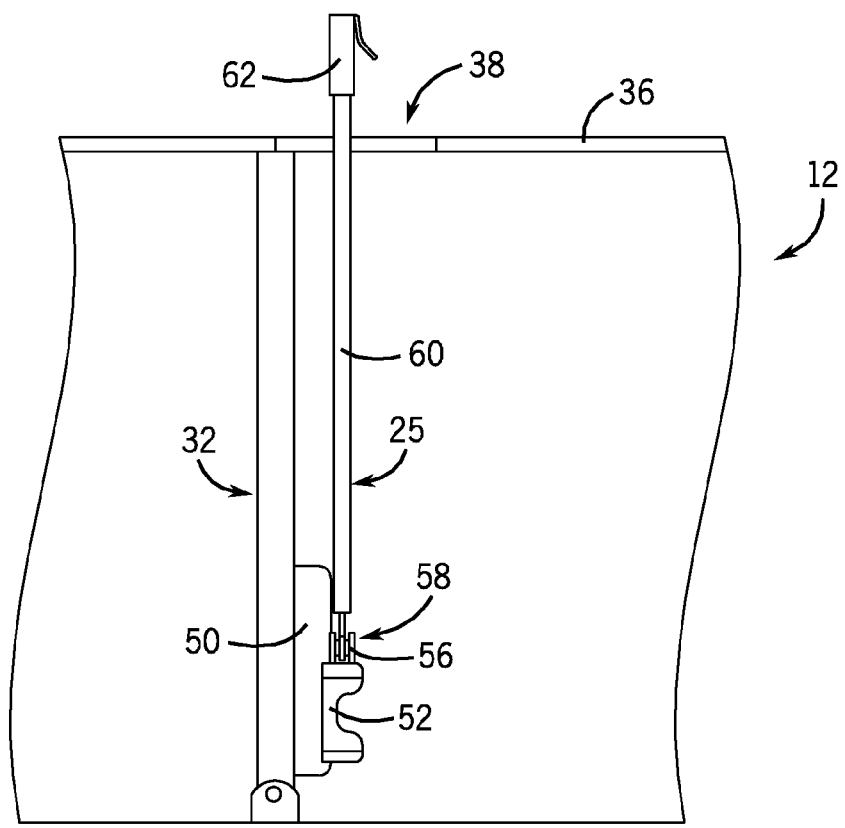
FIG. 4 is a side cutaway view of an embodiment of the tank and a ladder structure, the sensor, and the external position adjuster.

FIG. 4 is a cut-away side view of an embodiment of tank 12, also including position adjuster 25, ladder structure 32 and sensor 52. As depicted, external position adjuster 25 includes rigid rod 60, coupling structure 58, and handle 62. Handle 62 may also include a mechanism for coupling and uncoupling external position adjuster 25 from attachment to sensor 52 via sensor coupling structure 56. For example, a spring loaded lever in handle 62 may be pressed inward to open coupling structure 58, thereby allowing it to close around cylindrical coupling structure 56, enabling position adjuster 25 to mover sensor 52. External position adjuster 25 may be placed through access hole 38 of tank 12, thereby enabling an operator to access and adjust the position of sensor 52 within tank 12. After the operator has adjusted the position of sensor 52 within tank 12, the operator may decouple external position adjuster 25 from sensor 52 and withdraw external position adjuster 25 from within tank 12. As discussed, external position adjuster 25 enables the operator to easily access and manipulate the position of sensor 52 within tank 12 without having to climb inside tank 12. Further, the external position adjuster 25 enables a simple and flexible placement of the sensor 52, thereby providing the operator with an arrangement that enables adjustment of a tank level alarm that depends on the tank's contents.

Figure 5:
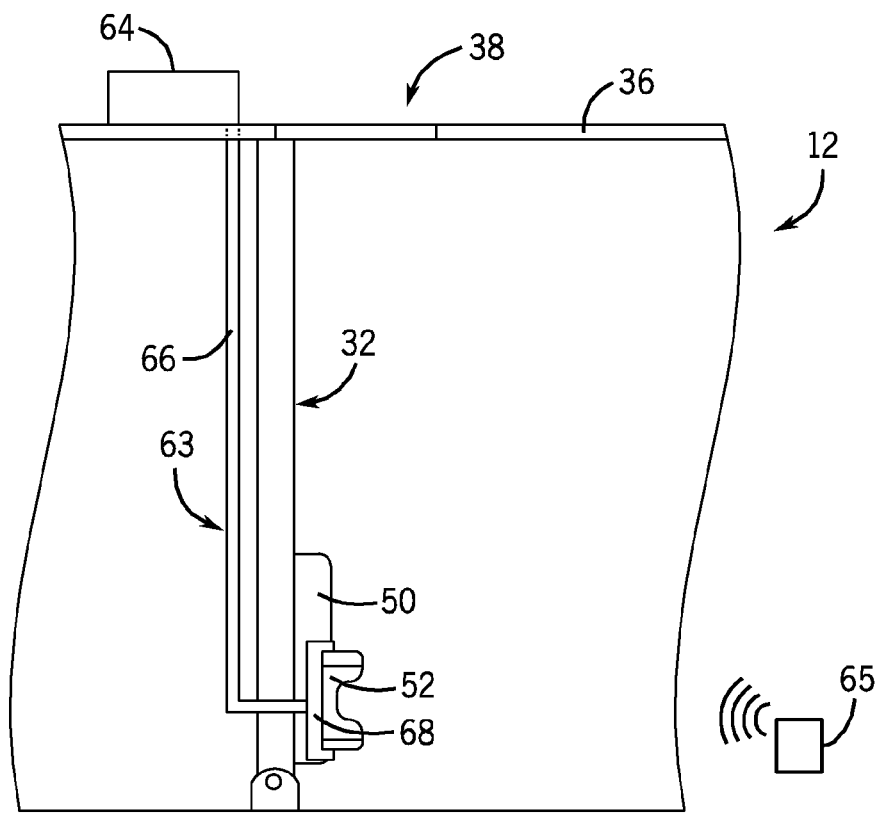
FIG. 5 is a side cutaway view of another embodiment of the tank and the ladder structure, the sensor, and the external position adjuster.

FIG. 5 is a cut-away side view of another embodiment of tank 12 and external position adjuster 63. As depicted, external position adjuster 63 includes a remote control box 64 located on upper surface 36 of tank 12. A wired or wireless control 65 may be used to communicate with remote control box 64, which communicates via communication line 66 to drive 68. Wireless control 56 may be locate within the cab of a tractor and may communicate via infrared, Bluetooth, or other suitable methods with remote control box 64. Line 66 may be an electrical, network, fluid, or other suitable communication line to control a drive 68, on which sensor 56 may be mounted. For example, drive 68 may be an electric motor drive, a fluid based (e.g., hydraulic or pneumatic) drive, or other suitable drive. Drive 68 may move vertically along mounting plate 50, thereby moving sensor 52 up and down via communication from remote control box 64 and wireless control 65, which are located outside tank 12. For example, wireless remote control 65 may communicate to remote control 64, thereby sending an electrical signal via communication line 66, commanding drive 68 to move vertically along a track on mounting structure 50. In turn, the drive 68 moves sensor 52 within tank 12 while the operator is controlling the position via wireless control 65 outside tank 12. Drive 68 may be coupled to a track on mounting structure 50, thereby enabling the sensor 52, mounted to drive 68, to move vertically to adjust the tank level detected by the sensor 52. External position adjuster 63 enables a user to control the location of and tank level detected by sensor 52 from outside tank 12, providing a flexible and easy way to adjust the position of sensor 52 without exposing the operator to contents within the tank 12. As appreciated, line 66, remote control 64, and drive 68 may also be pneumatic, hydraulic, or other suitable systems to move the position of sensor 52 along mounting structure 50. In another embodiment external position adjuster 63 may be located underneath tank 12 to enable an operator to access and adjust the position of sensor 52 from underneath tank 12. Further, external position adjuster 63 may be located on the side of tank 12 to allow adjustment from the side of tank 12.

Figure 6:
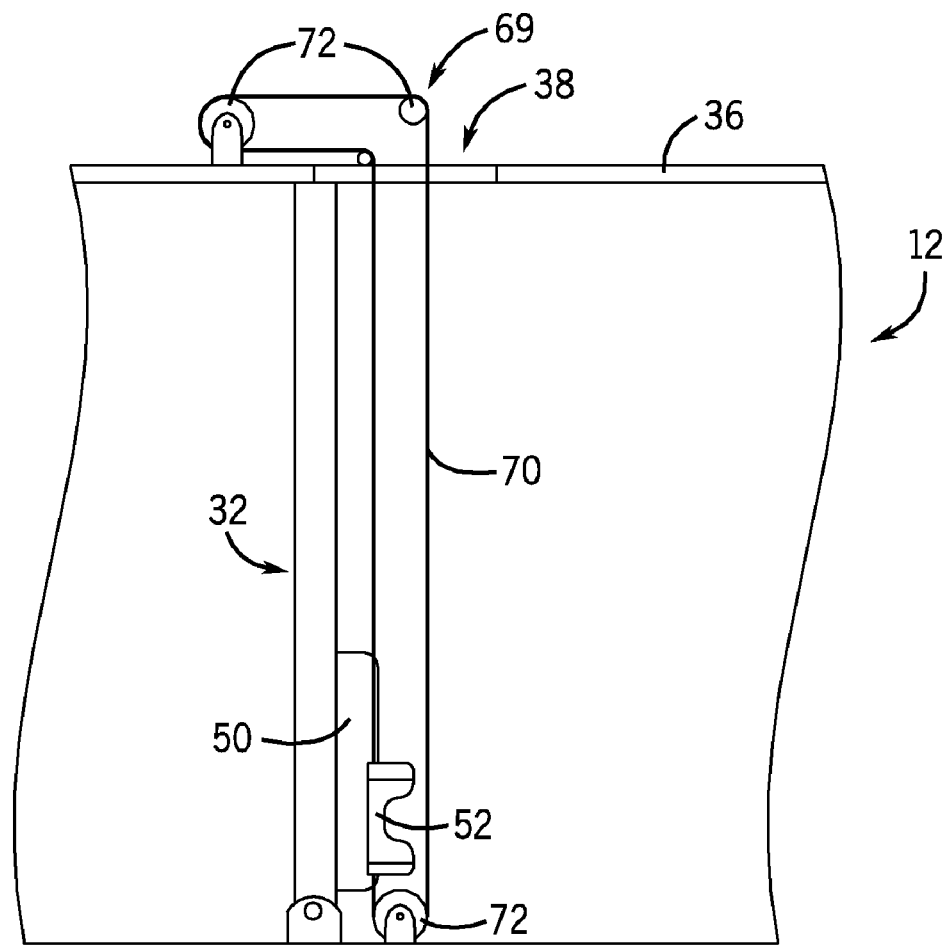
FIG. 6 is a side cutaway view of another embodiment of the tank and the ladder structure, the sensor, and the external position adjuster.

FIG. 6 is a side cut-away of an embodiment of tank 12, including an external position adjuster 69. External position adjuster 69 includes a flexible line 70, which may be made of a suitable flexible material, such as rope, plastic, or metal. Flexible line 70 is routed through access opening 38, along pulleys 72 that may be mounted on the floor of tank 12 as well as outside the upper surface 36 of tank 12. As depicted, sensor 52 may include components that couple to a track located on mounting structure 50, which enables sensor 52 to move vertically along mounting structure 50 as the flexible line 70 is moved along pulleys 72 and other components of external position adjuster 69. For example, external position adjuster 69 enables an operator to stand on an access platform, mounted on the tank upper surface 36, and manually feed the line 70 through pulleys 72, thereby adjusting the position of sensor 52 without the operator having to climb inside tank 12.

Figure 7:
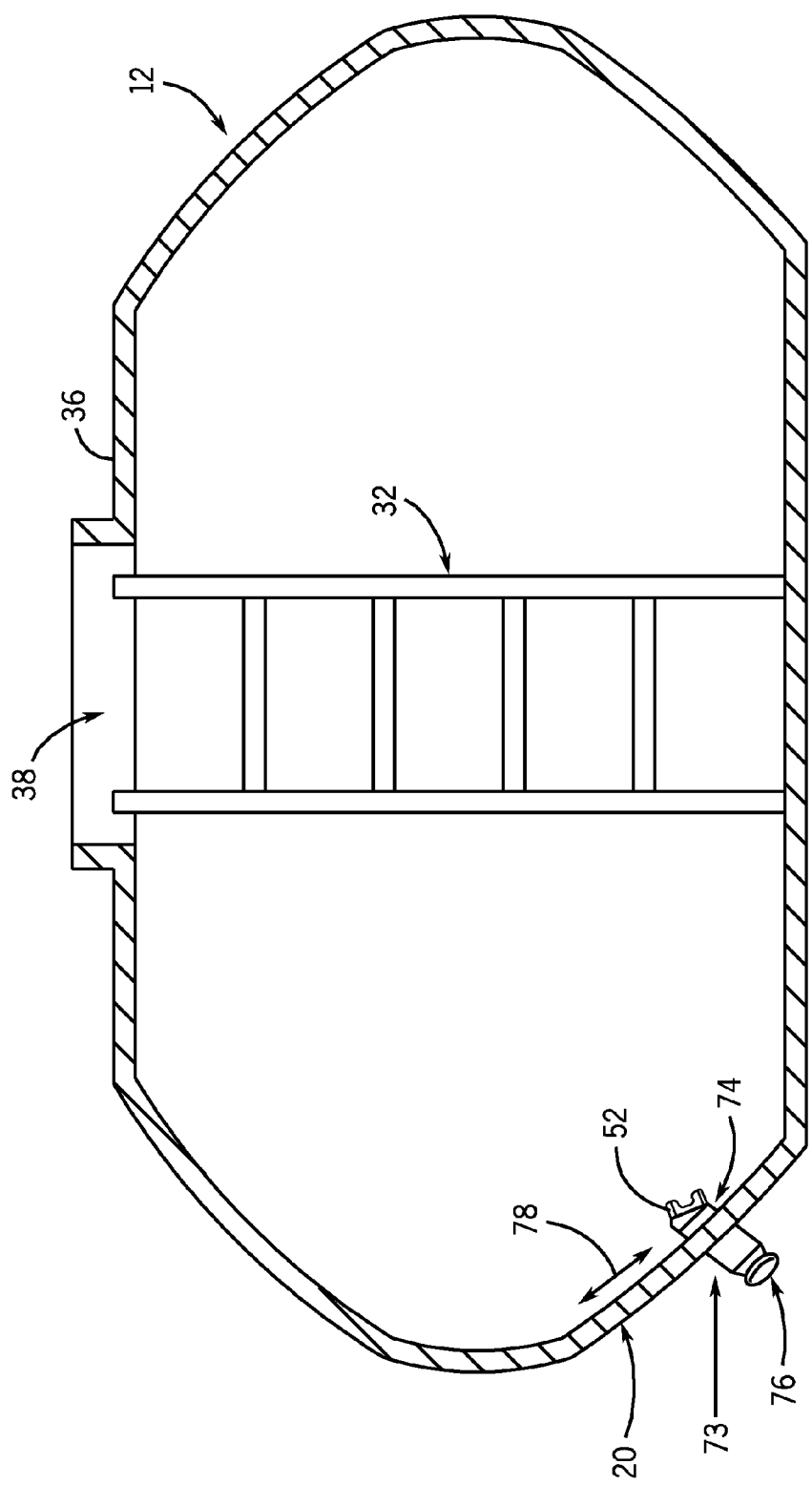
FIG. 7 is a side cutaway view of another embodiment of the tank and the ladder structure, the sensor, and the external position adjuster.

FIG. 7 shows a cut-away end view of an embodiment of tank 12, including ladder structure 32 and external position adjuster 73. In the embodiment of tank 12, the tank walls 20 may be composed of a plastic material of appropriate thickness to contain chemicals or fertilizer contents. The tank walls 20 may be of an appropriate thickness to enable a magnet field to transmit through the wall 20 to magnetically couple to and position a metal component located inside tank 12. The magnetically coupled component may be located in or coupled to inner portion 74. External position adjuster 73 includes inner portion 74 and exterior handle portion 76. Inner portion 74 includes a metallic component of sufficient size and strength to couple and attach to a portion of tank wall 20 where exterior handle 76 is located. Further, exterior handle portion 76 contains a suitable magnet to attract the metallic component located in inner portion 74 through wall 20. In other embodiments, exterior handle portion 76 may include a metallic component while inner portion 74 includes a magnet.

As shown, sensor 52 is mounted on inner portion 74 and moves along with external position adjuster 73 in direction 78, thereby changing its location within tank 12. For example, an operator from outside tank 12 may grab exterior handle 76, moving the position of exterior handle 76 upward along tank wall 20, thereby increasing the level (e.g., from 10% to 25% of full capacity) indicated or alarmed to an operator. As exterior handle 76 is moved upward, inner portion 74 is moved upward via the magnet, which is magnetically coupled to the exterior handle 76 through tank wall 20. This arrangement enables an operator to adjust the position of sensor 52 from outside tank 12, thereby greatly simplifying the adjustment procedure without exposure to materials within tank 12. Moreover, a track or indentation wall 20 may be provided that provides a path for external position adjuster 73 to move along direction 78 within tank 12. Further, the exterior of wall 20 may also include markings to indicate where sensor 52 may be located within tank 12 at a certain exterior handle portion 76 position. For instance, there may be markings that show the exterior handle portion 76 location at 10%, 20%, 30%, 40%, and 50% of tank capacity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an external position adjuster configured to move a sensor within an agricultural tank without requiring access inside the agricultural tank; wherein the external position adjuster is configured to actuate a drive coupled to the sensor.

2. The system of claim 1, wherein the external position adjuster comprises a rigid extension rod.

3. The system of claim 1, wherein the external position adjuster comprises a flexible extension line.

4. The system of claim 3, wherein the extension line is disposed on a plurality of pulleys.

5. The system of claim 1, wherein the external position adjuster comprises a remote control.

6. The system of claim 1, comprising the drive having an electric drive.

7. The system of claim 1, comprising the drive having a fluid drive.

8. The system of claim 1, wherein the external position adjuster comprises a magnet external to a side of a tank wall and the sensor is located on the interior of the side.

9. The system of claim 1, comprising the sensor having a magnet configured to magnetically couple to a structure within the agricultural tank.

10. The system of claim 1, comprising a magnetic coupling between the external position adjuster and the sensor.

11. A method, comprising:
magnetically coupling a sensor to a structure located inside an agricultural tank, wherein the sensor is adjustable to different positions inside of the agricultural tank in response to user input from outside of the agricultural tank; wherein the sensor is adjusted via a drive coupled to the sensor.

12. The method of claim 11, wherein the sensor is adjusted via a rigid extension rod coupled to the sensor.

13. The method of claim 11, wherein the sensor is adjusted via a flexible extension line coupled to the sensor.

14. The method of claim 11, wherein the sensor is adjusted via a remote control.

15. A system, comprising
an external position adjuster located at least partially outside an agricultural tank and configured to enable position adjustment of a sensor inside the agricultural tank from a user input external to the agricultural tank, a mechanism to couple to and adjust a position of the sensor; wherein the external position adjuster is configured to actuate a drive coupled to the sensor.

16. The system of claim 15, wherein the external position adjuster comprises a rigid extension rod.

17. The system of claim 15, wherein the external position adjuster comprises a flexible extension line.

* * * * *